UNITED STATES PATENT OFFICE.

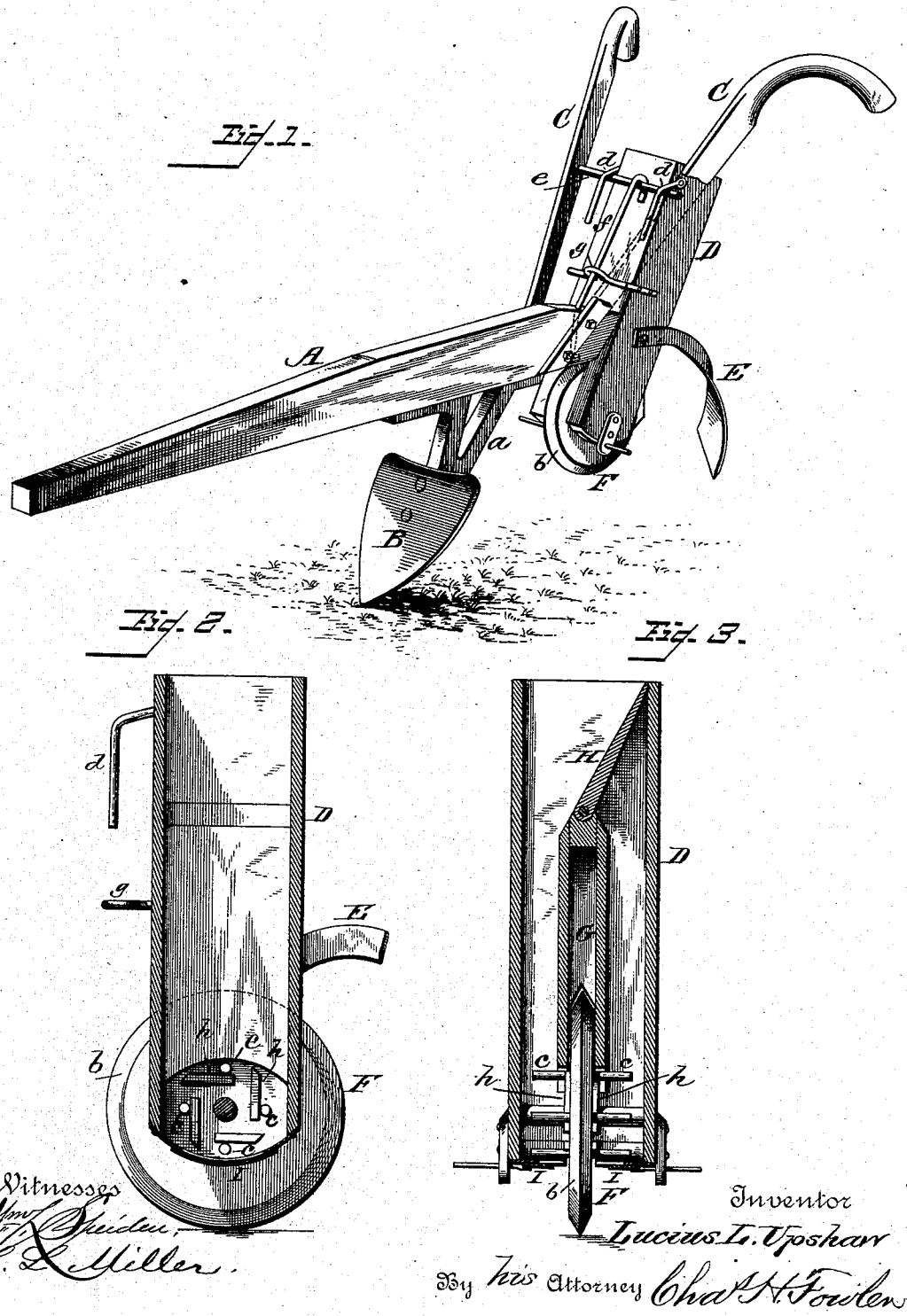

LOUCIUS L. UPSHAW, OF JACKSON'S GAP, ALABAMA.

COTTON-PLANTER AND FERTILIZER-DISTRIBUTER.

SPECIFICATION forming part of Letters Patent No. 349,325, dated September 21, 1886.

Application filed August 4, 1886. Serial No. 209,997. (No model.)

*To all whom it may concern:*

Be it known that I, LOUCIUS L. UPSHAW, a citizen of the United States, residing at Jackson's Gap, in the county of Tallapoosa and State of Alabama, have invented certain new and useful Improvements in Cotton-Planters and Fertilizer-Distributers; and I do hereby declare that the following is a full, clear, and exact description of the same, reference being had to the annexed drawings, making a part of this specification, and to the letters and figures of reference marked thereon.

Figure 1 of the drawings is a perspective view of my invention. Fig. 2 is a sectional view, on an enlarged scale, taken on a line longitudinal with the beam, and Fig. 3 a transverse section thereof.

The present invention has for its object to provide a simple, effective, and perfectly-operating device for planting cotton-seed and distributing fertilizer; and it consists in the details of construction, substantially as shown in the drawings, and hereinafter described and claimed.

In the accompanying drawings, A represents the beam, provided with the usual plow or furrow-opener, B, and standard $a$, said beam having the usual handles, C. To the rear end of the beam A is connected, in any suitable manner, the hopper D, having attached to its sides coverer-blades E. To the lower end of the hopper is suitably journaled a wheel, F, which rolls in the furrow behind the plow, the axle of said wheel being stationary. This wheel in its revolution feeds or distributes cotton-seed on one side and fertilizer on the other, said wheel being beveled, as shown at $b$, whereby the seed and fertilizer are left in the track of the wheel, such bevel on the wheel being considered of importance to attain the object above described. The wheel F, upon its sides, has agitators $c$, to thoroughly stir the contents of the hopper previous to its distribution.

The hopper D is divided into two compartments by a double-walled partition, G, and between said walls extends the periphery of the wheel F, thus preventing it from chocking. To the upper end of the wall G is pivoted a chute, H, so that when filling either compartment of the hopper the chute is swung over in position, which closes the compartment not to be filled, thereby keeping the fertilizer and seed separate, and preventing them from being mixed when supplying the hopper. When using fertilizer alone, or cotton-seed, as the case may be, the chute, if preferred, may be removed. The coverers E may be of any desirable construction, made either stationary or made to drag, as preferred. To the lower end of the hopper D is a suitable gage plate or plates, I, of any of the usual forms employed for closing or regulating the discharge-opening of the hopper. The hopper D may be attached to any ordinary plow-beam, and to enable this I have provided the hopper with hooked arms $d$, which hook over the usual brace-rod $e$ of the handle C. I also provide a rod, $f$, hooked at its upper end to engage with said brace $e$, said rod extending through an eye-bar, $g$, the latter being secured to the hopper D. To the sides of the wheel F are blocks $h$, to increase the agitating effect upon the contents of the hopper.

Having now fully described my invention, what I claim as new, and desire to secure by Letters Patent, is—

1. In a cotton-planter and fertilizer-distributer, the combination, with plow and plow-beam, of a hopper provided with a double-walled partition having at its upper end a pivoted chute, and a wheel provided with agitators and blocks upon its sides, the periphery thereof extending between the walls of the partition, and suitable coverers secured to the hopper, substantially as and for the purpose set forth.

2. The combination, with a plow, beam, and handles thereof, of a hopper provided with coverers, double-walled partition, pivoted chute, and a distributing-wheel, said hopper having hooked rods and an eye-bar for connecting it to the plow, beam, and handles, substantially as and for the purpose set forth.

In testimony that I claim the above I have hereunto subscribed my name in the presence of two witnesses.

LOUCIUS L. UPSHAW.

Witnesses:
J. W. STROUD,
CHARLES HENDERSON.